United States Patent
Dunmire

[15] 3,692,062
[45] Sept. 19, 1972

[54] PIPE REPAIR CLAMP

[72] Inventor: Paul G. Dunmire, Oakland, Calif.

[73] Assignee: Christy Metal Products, Inc., Emeryville, Calif.

[22] Filed: Nov. 14, 1969

[21] Appl. No.: 876,789

[52] U.S. Cl. .................138/99, 24/279, 24/284, 24/285
[51] Int. Cl. .............................................F16l 55/16
[58] Field of Search ..........138/99; 24/284, 285, 279

[56] References Cited

UNITED STATES PATENTS

| | | | |
|---|---|---|---|
| 3,089,212 | 5/1963 | Graham et al. | 138/99 X |
| 3,189,970 | 6/1965 | Barr | 138/99 X |
| 3,195,206 | 7/1965 | Morriss, Jr | 24/279 |
| 3,204,665 | 9/1965 | Faint | 138/99 |
| 3,267,547 | 8/1966 | Morriss, Jr | 24/279 |
| 3,464,722 | 9/1969 | Larkin | 24/284 |

*Primary Examiner*—Carlton R. Croyle
*Assistant Examiner*—R. J. Sher
*Attorney*—Flehr, Hohbach, Test, Albritton & Herbert

[57] ABSTRACT

A pipe repair clamp assembly employing a flexible, metal band to be strapped and tightened about a pipe or other conduit for closing a leak in its side wall by compressing a resilient gasket seal encircling the pipe. The repair clamp includes an improved pair of lugs secured to adjacent ends of the band wherein the lugs each extend longitudinally of the pipe being sealed. Radially outwardly extending lug extension portions are formed on one of the lugs and an opening is formed in each. Radially outwardly protruding pairs of spaced retainer ears are carried by the other lug to define a radially open slot between each pair of ears. Bolts having a transverse cross-head extend both through the openings and an associated one of the slots so that the cross-head will lie radially between the ears and the conduit. Elongated fingers, spaced longitudinally of the lugs, project from one lug toward the other and serve to resist rotation of the ears noted above upon tightening of the bolts.

5 Claims, 7 Drawing Figures

INVENTOR.
PAUL G. DUNMIRE
BY Flehr, Hohbach, Test,
Albritton & Herbert
ATTORNEYS

PAUL G. DUNMIRE
INVENTOR.

PAUL G. DUNMIRE
INVENTOR.

BY Flehr, Hohbach, Test,
Albritton & Herbert
ATTORNEYS

PIPE REPAIR CLAMP

BACKGROUND OF THE INVENTION

This invention pertains to a pipe repair clamp assembly and more particularly to an improved pipe repair clamp assembly more readily installed under awkward and adverse conditions.

Heretofore, pipe repair clamps have been known of a type employing a flexible, substantially inelastic band adapted to be strapped and tightened about a conduit for compressing a resilient sealing gasket against a leak or other opening as may be found in the side wall of the conduit. Lugs, carried at adjacent ends of the encircling band arrangement, are employed together with bolts for drawing the ends of the band tightly together to apply adequate sealing pressure. Typically, a so-called armor plate bridges the gap defined between the ends of the band. As thus arranged, a single pair of lugs can cooperate at one side of the conduit for tightening the band about the conduit. An alternative to the above is to provide a pair of lugs located at diametrically opposite positions around the conduit.

SUMMARY OF THE INVENTION

In general, there has been provided a pipe repair clamp assembly of the type described above characterized by the improvement of radially outwardly extending lug extension portions formed on one of a pair of lugs and an opening formed in each such extension portion. In addition, on the other lug radially outwardly protruding pairs of spaced retainer ears are formed to define a radially open slot between each pair of ears. Bolts having an elongated shank and a cross-head portion transverse to the shank are disposed to extend both through the opening formed in the radially outwardly formed lug extension portions and also to lie in an associated one of the slots defined between the pairs of ears. So as not to bend the bolts during tightening, the cross-head portions each pivot in a seat formed radially between the ears and the conduit thereby permitting the shank to directly align itself with the forces applied when tightening the bolts. Elongated fingers spaced longitudinally of the lugs, and projecting therefrom to bridge the gap between the lugs, serve to resist rotation of the ears upon tightening of the bolts whereby radially inwardly applied pressure is developed for pressing the gasket seal against the conduit.

In addition to the above and in general, at least one of the base portions includes a tapered leading edge disposed in confronting relation to the other of said base portions. The leading edge is preferably formed with laterally spaced protruding nibs to engage holes in the ends of the band. The band therefore includes an end edge margin folded reversely and radially outwardly to conform to the tapered edge of the base portion, and small openings in the folded edge of the band accommodate entry of the nibs. Spots of weld material serve to secure the margin and tapered edge together whereby the shanks of the bolts lie in parallel closely spaced relation to a plane tangent to the periphery of the conduit at a spacing no greater than the aggregate thickness of the gasket, the base portion, and twice the thickness of said band.

The cross-heads of the bolts lie in cooperating seats which serve to hold the cross-head from turning when the nuts are tightened on the threaded end of the shank.

DESCRIPTION OF PREFERRED EMBODIMENT

Figure 1:
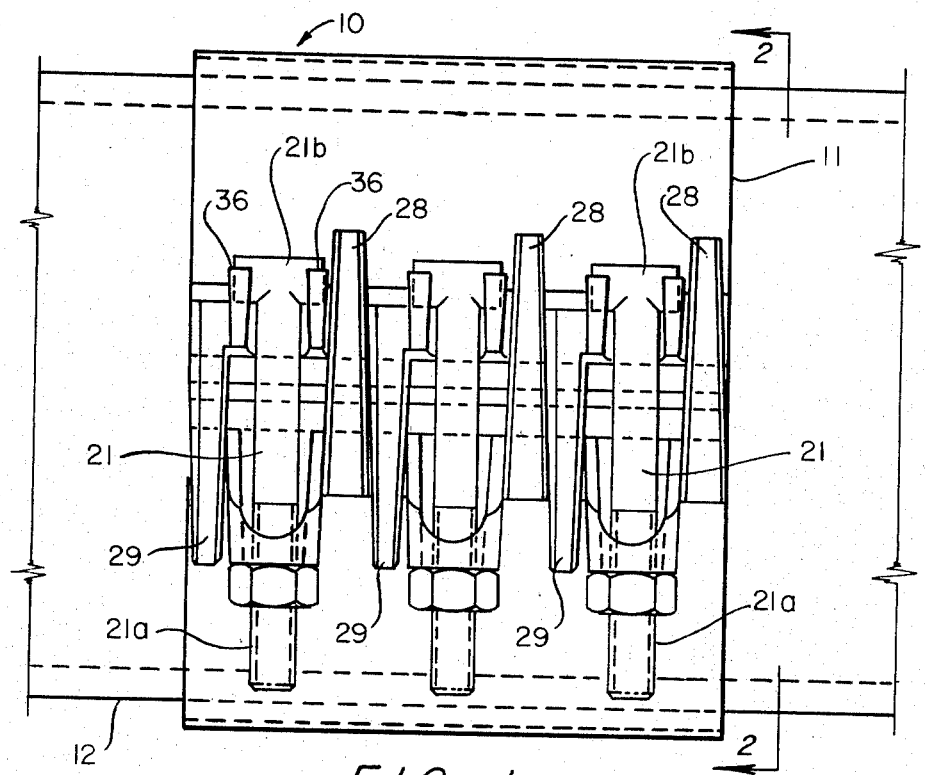
FIG. 1 is a side elevation view of a pipe repair clamp, according to the invention.
Figure 2:
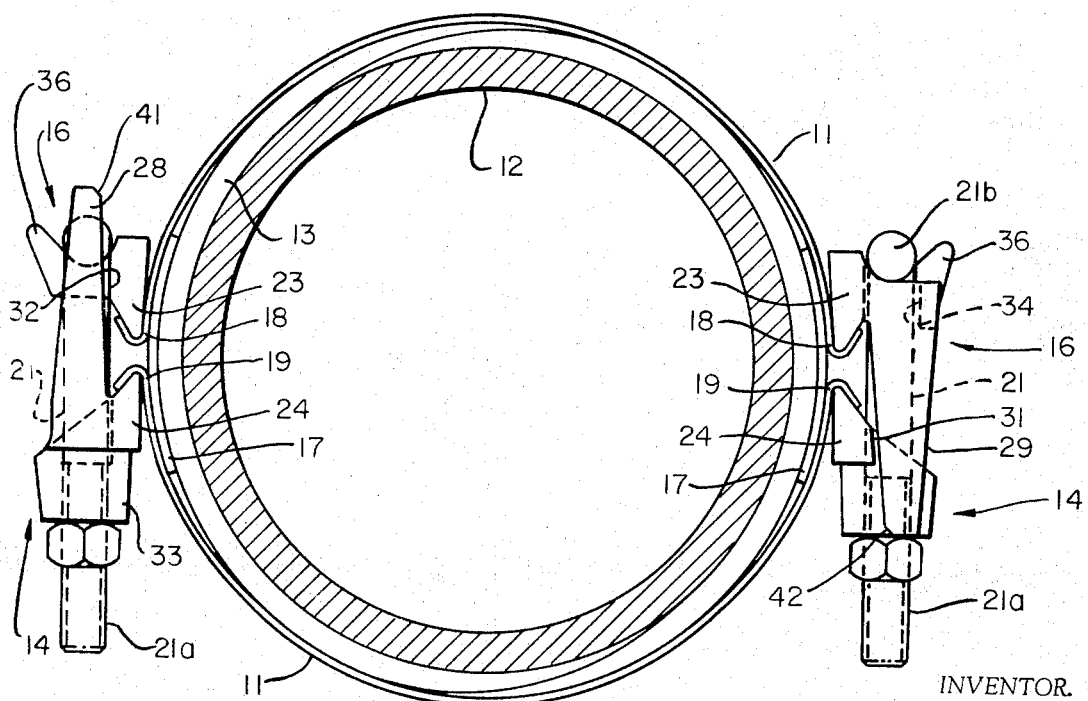
FIG. 2 is an end view of FIG. 1 taken along the line 2—2 thereof.
Figure 3:
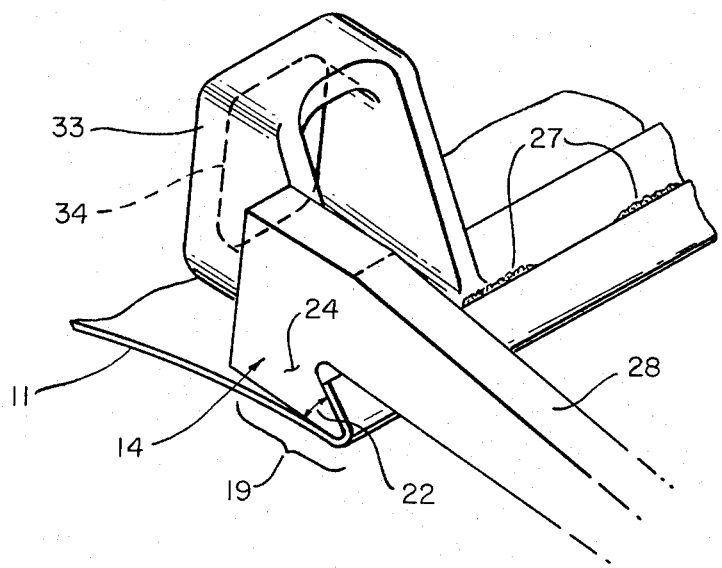
FIG. 3 is an enlarged detail perspective view of a portion of the repair clamp shown in FIGS. 1 and 2.
Figure 4:
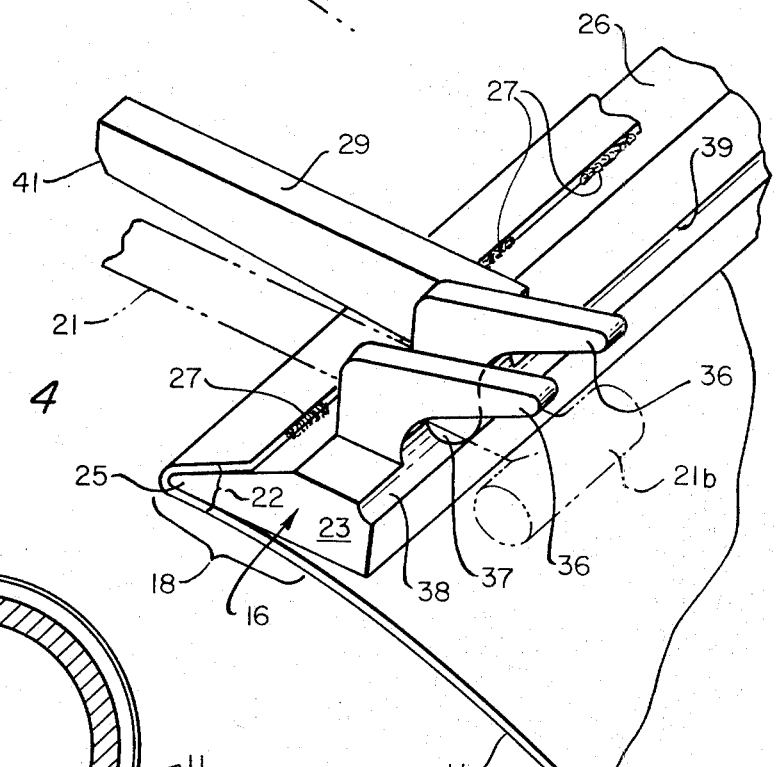
FIG. 4 is an enlarged detail perspective view of a portion of the repair clamp shown in FIGS. 1 and 2.
Figure 5:
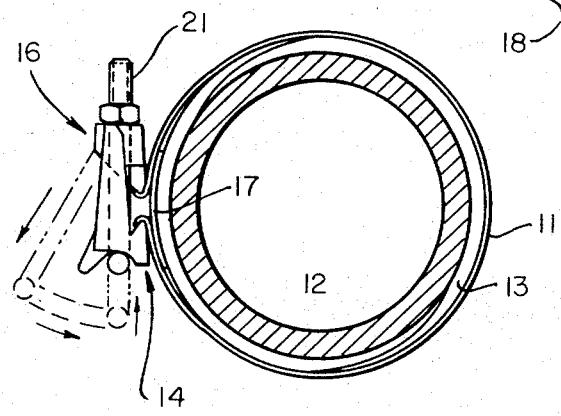
FIG. 5 is an end view of another embodiment according to the invention.

Having in mind the above general description of the invention, a preferred embodiment of a pipe repair clamp assembly 10 includes a flexible, substantially inelastic band 11 of metal, such as stainless steel, adapted to be strapped and tightened about a conduit 12 such as a water pipe or main having a diameter on the order of 2 to 12 or more inches. A resilient gasket seal 13 is disposed between band 11 and the periphery of conduit 12.

Each of a pair of lug assemblies 14, 16 is secured to the ends of band 11 for drawing together the adjacent ends thereof. An arcuate semi-rigid armor plate 17 is interposed between gasket 13 and the adjacent ends 18, 19 of band 11.

Ideally, tension should be applied to tighten band 11 by drawing the ends thereof together using forces acting in a plane tangent to the band. In other words, it is desirable to locate tightening bolts which extend between lugs on the ends of a repair clamp band as closely as possible to the periphery of the conduit being repaired. It is to be appreciated that great forces are developed in the tightening of a band about a conduit as it is being repaired and that heretofore many attempts have been made to improve upon the manner of fastening the lug to the end of the band whereby the bolts can remain closely spaced from a plane tangent to the periphery of the band while providing satisfactory attachment between the lugs and the band whereby the attachment will not fail when subjected to the above mentioned forces applied in tightening the band about a conduit as well as in its subsequent use.

As disclosed herein, minimal spacing is achieved between lug bolts 21 and a plane tangent to the periphery of conduit 12 by folding the end edge margin of each adjacent end 18, 19 of band 11 reversely and radially outwardly to an overfolded position forming a portion defining a V-shaped lip 22 in the adjacent band ends. Each lug includes a base portion 23, 24 adapted to extend longitudinally of conduit 12 and including a V-shaped longitudinal edge portion 25 formed to engage one of the lips 22. The tapered edge portions 26 are not spot welded as at 27 at spaced intervals along the length of lip 22.

While it might ordinarily be expected that the use of a few spot welds such as 27 would not be sufficient to maintain the lugs secured to the ends of the flexible repair clamp band, it has been observed that the relatively sharp bend formed in lips 22 provides a substantial portion of the holding function involved. The spot welds 27 serve to keep lip 22 from flipping radially outwardly to a position where they could interfere with the functioning of bolts 21, or possibly release the grip of the overfolded band end.

Figure 6:
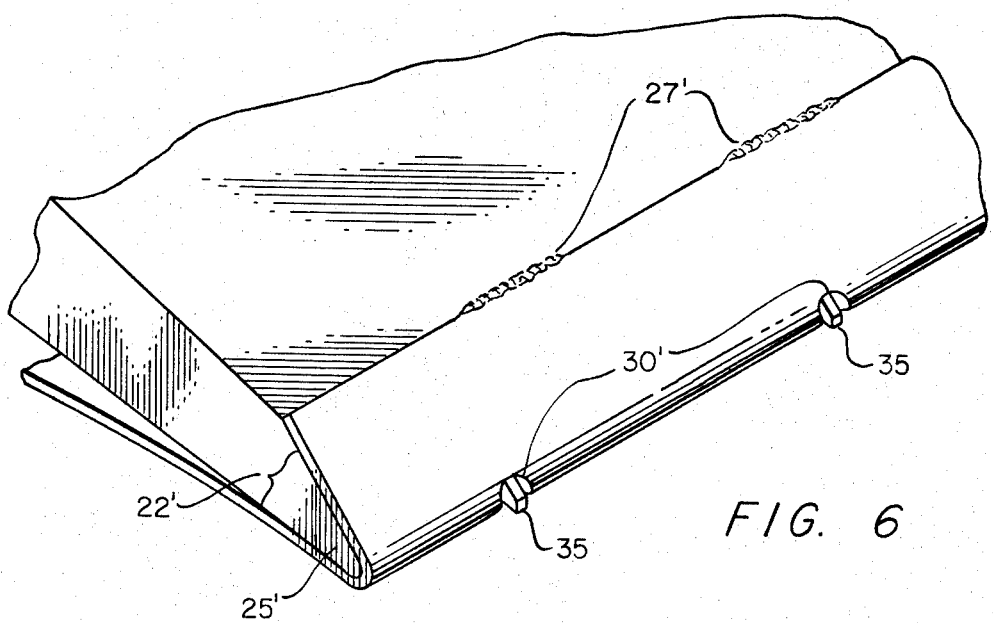
FIGS. 6 and 7 each show enlarged detail perspective views of two additional embodiments for attaching the band ends to associated lugs.

It has also been found that additional holding power may be imparted to the above lug attachment scheme by forming small spaced openings 30 (FIG. 6) through each lip 22 of the overfolded band ends and forming the tapered lug edge portion 25' with projecting spaced nibs 35, for example, cast integral to the edge portion 25'.

Figure 7:
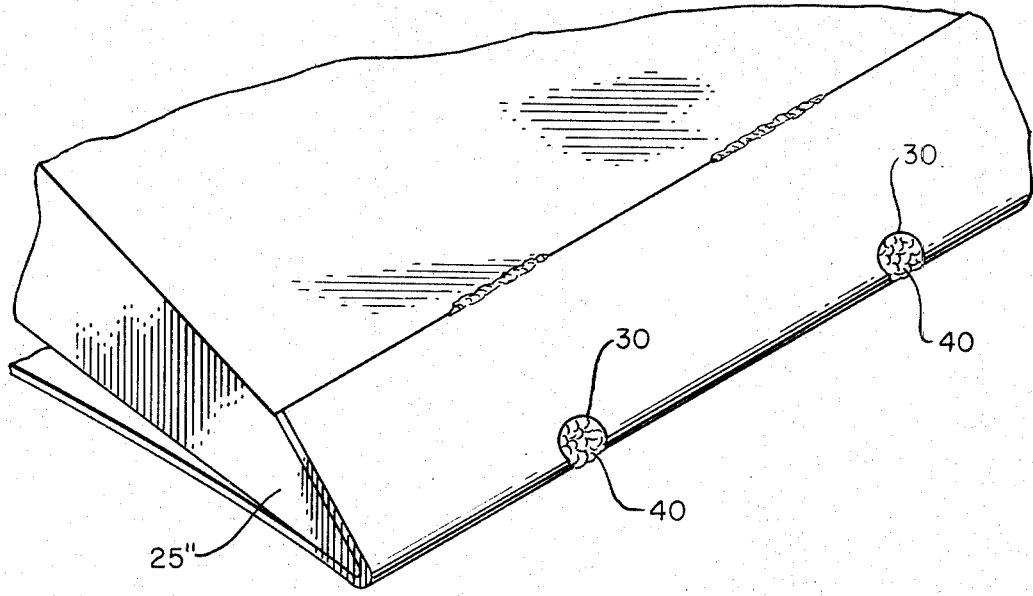

Comparably, improved holding power may also be imparted (FIG. 7) by filling the openings 30 with a deposit of weld material 40 as by means of plug welding into the tapered edge portion 25'' through the holes 30.

Each lug assembly 14, 16 includes a plurality of longitudinally spaced fingers 28, 29 respectively, projecting forwardly from their respective base portions 24, 23 so as to ride upon the radially outer surface 31, 32 respectively, of base portions 24, 23.

Means for drawing the ends of band 11 toward one another includes a plurality of longitudinally spaced radially outwardly extending lug extension portions 33 formed on lug assembly 14 and having openings 34 extending therethrough for receiving a bolt 21.

Bolts 21 include elongated threaded shank portions 21a and a transversely extending cross-head portion 21b for use as now to be described.

Lug assembly 16 is formed with a plurality of pairs of bifurcated lug extension portions in the form of ears 36 to extend radially outwardly from lug assembly 16 and define slots 37 adapted to be aligned with an associated one of openings 34. Thus, the threaded shank portion of bolt 21 can be disposed in opening 34 with a nut threaded onto its end prior to assembling the pipe repair clamp about a conduit to be repaired. Thereafter, during assembly, the head portion 21b of bolt 21 is readily passed into slot 37 and the nut taken up tightly so that the head portion 21b of bolt 21 cannot escape from its captured position. Thus, the ears 36 retain head portion 21b in the relieved zone formed between the ears and the outer surface of the base portion 23 of assembly 16.

The outer surface 38 includes a registration edge 39 extending longitudinally of the outer surface of base portion 23 and bounding the relieved zone behind each of the pairs of ears 36. Edge 39 engages cross-head 21b and prevents bolts 21 from turning as they are tightened.

As thus arranged, rounded portions of head 21b seat snugly in correct alignment against the arcuate surfaces defined behind ears 36 whereby the cross-head lies in registry with edge 39. With the foregoing arrangement, the bolt 21 is readily able to pivot and adjust to the manipulative movements involved in positioning and tightening a nut onto the threaded shank whereby the tendency toward binding as heretofore experienced with other types of lug assemblies is eliminated.

The tightening of bolts 21 serves to draw the adjacent ends of band 11 toward each other with a substantially tangentially applied force relative to the periphery of the conduit 12. The force so applied tends to rotate each of the lugs about a longitudinal axis whereby the tapered leading portions of base 23, 24 tend toward being thrust into the armor plate 17. However, the elongated rigid fingers 28, 29 serve to transmit these rotative tendencies from one lug to the other so as to press the armor plate 17 against gasket seal 13. Thus, it is the restraining action of fingers 28, 29 cooperating with the tendency towards introducing rotation to each of lug assemblies 14, 16 which serves to provide a generally radially acting pressure against gasket 13 while drawing the adjacent ends of the flexible band 11 about conduit 12.

With a pipe repair clamp assembly as above described, it has been observed that manual installation of the assembly about a leaking conduit under adverse field conditions is readily attained since it is possible to apply the clamp assembly 10 without need to thread bolts through pairs of aligned openings. Thus, during installation, the assembly is made ready by introducing bolts 21 through openings 34 with the nuts already applied thereto and then disposing the repair clamp assembly in a manner whereby the nuts are located on the top side of the pipe. The bottom end of bolts 21 can be readily fitted behind the ears 36 merely by feeling the presence of the ears and, therefore, it is not necessary to guide or feed the bolt upwardly through a pair of aligned bolt holes.

The ends of fingers 28, 29 have been tapered as at surfaces 41, 42 whereby during assembly of a repair clamp assembly about a conduit to be repaired, the tip ends of fingers 28, 29 readily ride up the ramp provided by the upwardly tapered surfaces formed at the leading edge of each of lug assemblies 14, 16.

From the above, it is apparent that an improved repair clamp is provided whereby installation can be easily effected simply by "feel" to attach the bolts; the bolts pivot during tightening to prevent binding; and the sharp lug edge attached to the band end serves to lie in a plane quite close to the "ideal" tangent plane defined through the band end so as to apply tightening forces from that position; and the band ends are very simply attached to the lugs using spots of weld material disposed only as required to hold the folded margins of the band end from merely flipping radially outwardly away from the lug.

I claim:

1. In a pipe repair clamp assembly of the type employing flexible, substantially inelastic band means adapted to be strapped about a conduit for closing a leak in the side wall thereof and a resilient gasket seal interposed between the band means and the periphery of the conduit, the improvement comprising a pair of lugs secured to adjacent ends of the band means, said lugs each including an elongated base portion adapted to extend longitudinally of the conduit, radially outwardly extending lug extension portions formed on one of the lugs and an opening formed in each said extension portion, radially outwardly protruding pairs of spaced retainer ears carried by the other lug to define a radially open slot between each said pair of ears, bolts having an elongated shank and a cross-head portion transverse thereto disposed to extend both through said openings and an associated one of said slots, said ears including elongated camming surfaces thereon disposed to confront said conduit, disposed cross-head portion lying radially between said ears and said conduit to ride along said camming surfaces and to pivot thereon during tensioning of said bolts, and elongated fingers spaced longitudinally of the lugs and projecting therebetween serving to resist rotation of said ears upon tightening said bolts, at least one of said base portions including a tapered leading edge disposed in confronting relation to the other of said base portions, and an end of said band means including an edge margin folded in a single crease at a relatively sharp angle reversely and radially outwardly to provide a lip dosposed to conform to said tapered edge, said crease including a plurality of laterally spaced openings and means engaging said openings from said tapered edge to hold the end of the band when tightening the bolts.

2. In a pipe repair clamp according to claim 1 wherein the last said means includes a deposit of weld material.

3. In a pipe repair clamp according to claim 1 wherein the last said means includes protruding nibs formed integral to said edge and engaging said openings.

4. In a pipe repair clamp assembly having flexible, substantially inelastic band means adapted to be strapped and tightened about a conduit for closing a leak in the side wall thereof and a resilient gasket seal interposed between the band means and the periphery of the conduit, a pair of lugs secured to adjacent ends of the band means, said lugs each including an elongated base portion adapted to extend longitudinally of the conduit, radially outwardly extending lug extension portions formed on one of the lugs and an opening formed in each of said extension portions, radially outwardly protruding means including elongated guiding surfaces confronting said conduit and carried by the other lug, bolts having an elongated shank, a head portion transverse thereto and take-up means to engage the lug extension portions and said radially outwardly protruding means to draw said lugs and associated band ends toward each other as said head portion moves in pivoting relation along said guiding surfaces, one of said base portions including a tapered leading edge disposed in confronting relation to the other of said base portions, said band means including an end edge margin folded reversely and radially outwardly to provide a crease disposed to conform to and receive said tapered edge, and spots of weld material securing said margin and tapered edge together to prevent said margin from being unfolded under tensioning of said band means, at least one opening extending through said crease and means extending into the opening from the tapered edge of said base portion to hold the end of the band when tightening the bolts.

5. In a pipe repair clamp assembly of the type employing flexible, substantially inelastic band means adapted to be strapped about a conduit for closing a leak in the side wall thereof and a resilient gasket seal interposed between the band means and the periphery of the conduit, the improvement comprising a pair of lugs secured to adjacent ends of the band means, said lugs each including an elongated base portion adapted to extend longitudinally of the conduit, radially outwardly extending lug extension portions formed on one of the lugs and an opening formed in each said extension portion, radially outwardly protruding pairs of spaced retainer ears carried by the other lug to define a radially open slot between each said pair of ears, bolts having an elongated shank and a cross-head portion transverse thereto disposed to extend both through said openings and an associated one of said slots, said ears including elongated camming surfaces thereon disposed to confront said conduit, said cross-head portion lying radially between said ears and said conduit to ride along said camming surfaces and to pivot thereon during tensioning of said bolts, and elongated fingers spaced longitudinally of the lugs and projecting therebetween serving to resist rotation of said ears upon tightening said bolts, one of said base portions including a tapered leading edge disposed in confronting relation to the other of said base portions, and said band means including an end edge margin folded in a single crease reversely and radially outwardly at a relatively sharp angle to said tapered edge, and spots of weld material securing said margin and tapered edge together for preventing said margin from being unfolded under tensioning of said band means, said crease including a plurality of laterally spaced openings and said tapered leading edge having projecting nibs respectively disposed to engage said openings for holding the end of the band.

* * * * *